Jan. 1, 1946.                C. W. DAKE                2,392,122
                          TELESCOPE SIGHT
                       Filed July 21, 1943           2 Sheets-Sheet 2
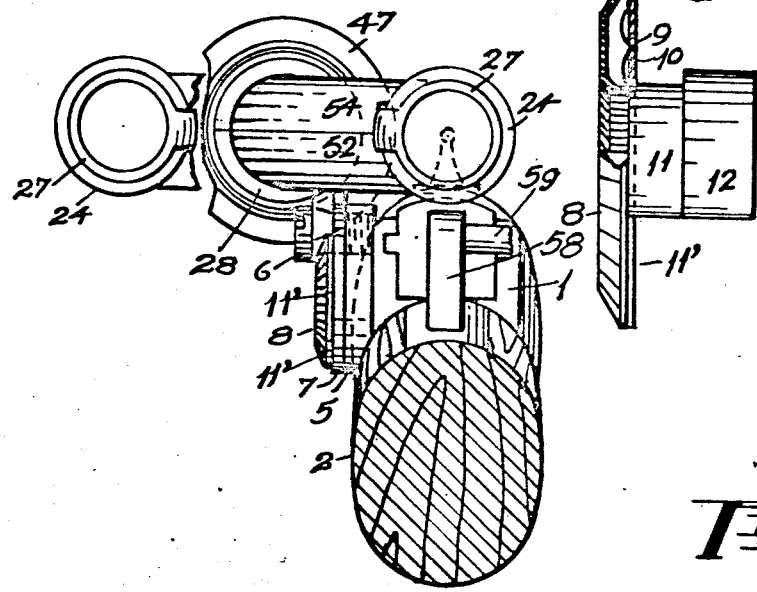
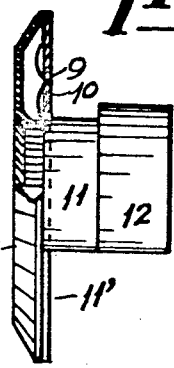
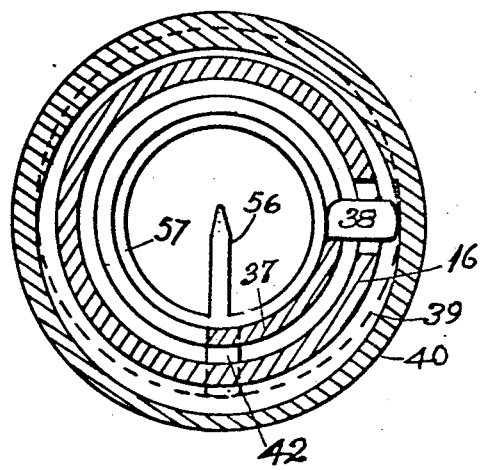
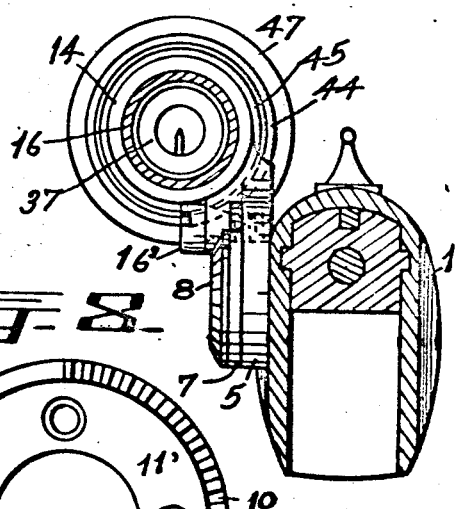
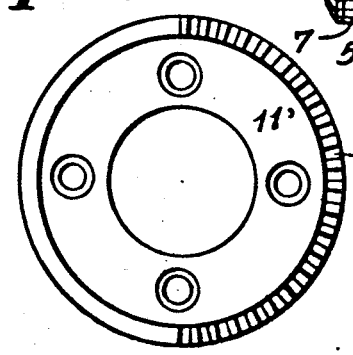
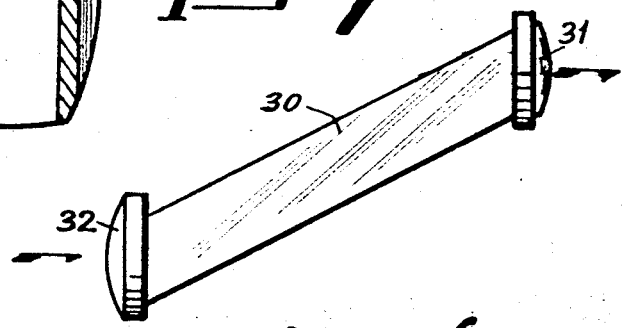
Charles W. Dake
Inventor Patented Jan. 1, 1946

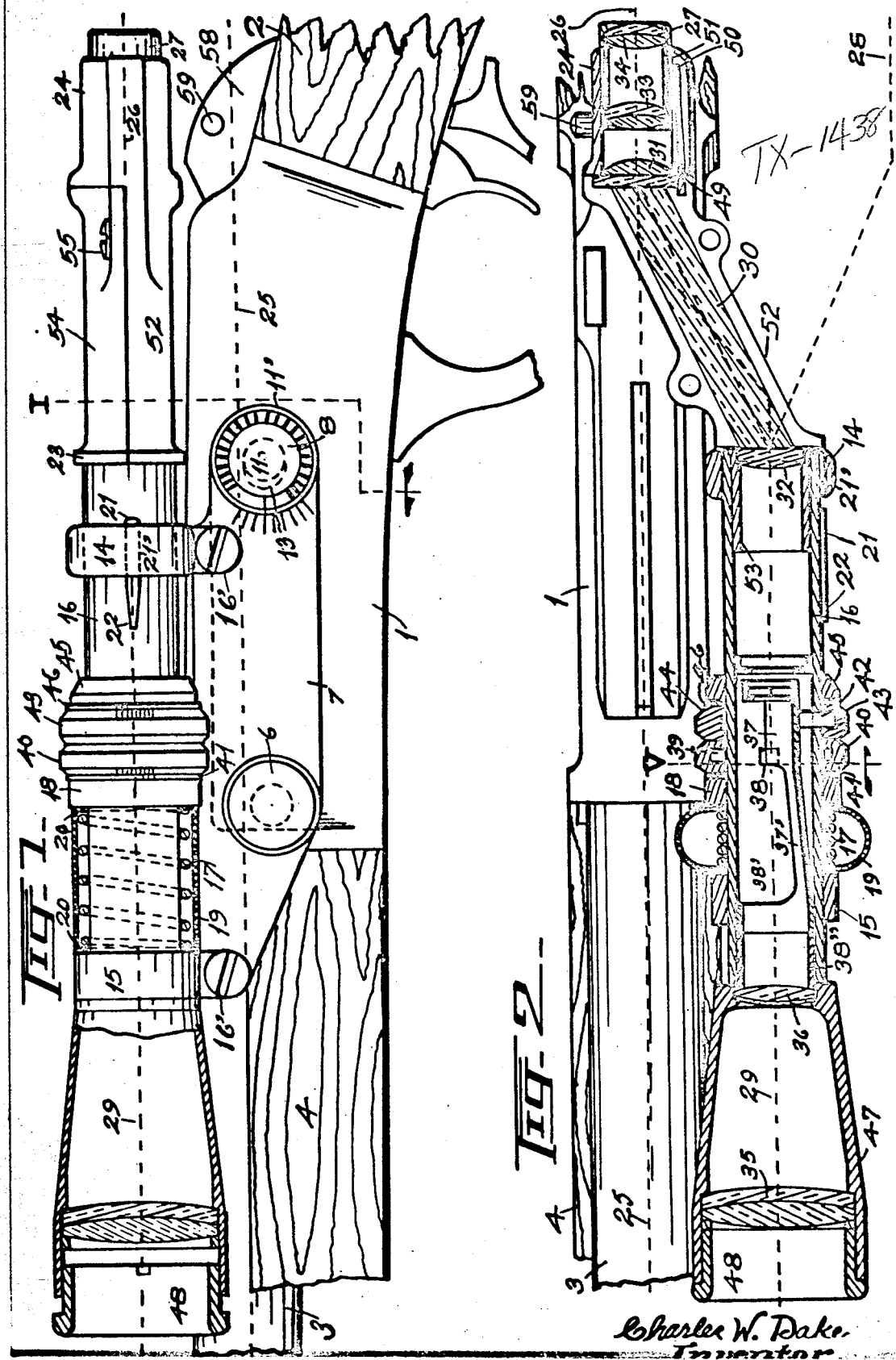

2,392,122

UNITED STATES PATENT OFFICE 2,392,122

TELESCOPE SIGHT

Charles W. Dake, Grand Haven, Mich.

Application July 21, 1943, Serial No. 495,545

10 Claims. (Cl. 33—50)

My present invention relates to improvements in telescope sights and particularly to prismatic telescope sights for use in connection with guns whereof the cartridge cases are ejected generally upward from the receiver of the gun; and the objects of improvement are: first, to provide an improved telescope sight that, when mounted on a Garand military rifle, will not interfere with single loading the rifle; two, to provide an improved telescope sight that, when mounted on a Garand military rifle, will not interfere with the cartridge clip when it is automatically ejected when emptied of its last cartridge; third, to provide an improved telescope sight for guns that can be used in conjunction with standard military and sporting rifle sights simultaneously; fourth, to provide an improved prismatic telescope sight having an improved light transmission; fifth to provide a prismatic sight of which the prism and other members of the optical system can be readily removed and replaced; sixth, to provide an improved telescope sight having an improved elevation adjustment; seventh, to provide an improved telescope sight having an improved reticle adjustment means; eighth, to provide an improved telescope sight whereby the shooter can sight the gun by one eye using open military or sporting iron sights and with the other eye using the telescope sight simultaneously; ninth, to provide an improved telescope sight whereby the shooter can use open military sights when shooting long ranges and the telescope sight for short range or jungle shooting without change of sights or the stock of the gun; tenth, to provide an improved prismatic telescope sight having improved reticle adjusting means; eleventh, to provide a prismatic telescope sight having a sight barrel having a member slidable in the barrel for lengthening the barrel for protecting the object lens against rain and flying particles of material; twelfth, to provide an improved prismatic telescope sight that will permit use of the conventional or military iron sights simultaneously with the telescope sight.

I attain the above named objects and such other objects as may appear from a perusal of the following description and the structure disclosed by the accompanying drawings, in which:

Figure 1 is a side elevation in part section of my improved telescope sight mounted on a top ejection rifle with the axis of the eyepiece in sighting position of the military or open sporting sights on the barrel of the rifle.

Figure 2 is a top plan view of Fig. 1 in which the telescope barrel, sight adjustments and optical system is shown in section.

Figure 3 is a rear view of the sight attached to the receiver portion of the rifle and including the elevation adjusting means.

Figure 4 is a transverse cross-sectional view of the telescope sight taken on line 1 of Figure 1 and looking in the direction the arrow on the line indicates.

Figure 5 is an enlarged part sectional view of the elevation adjusting stud and dial button.

Figure 6 is an enlarged cross sectional view of the reticle adjustment members.

Figure 7 is an enlarged side view of the proposed prism removed from the sight with a lens cemented to each of its flat ends.

Figure 8 is an enlarged view of the elevation adjustment dial plate which is sunk into the adjustable member of the elevation adjustment mechanism and secured to said member.

Throughout the several views of the drawings, similar numerals refer to similar parts or portions of my telescope sight, and referring thereto:

Numeral 1 refers to the receiver of a top ejection rifle which is the type of rifle largely employed by hunters for larger game shooting, numeral 2 is a broken away portion of the butt stock, and 3 the rifle barrel screwed into the receiver and imbedded into the forehand portion 4 of the stock. Secured usually to the left side of the receiver 1 is sight adaption plate 5 whereby the telescope of the sight may be adapted to rifles such as the Duran rifle which has a different shaped receiver than the one shown in the accompanying drawings, and to which the adaption plate may be shaped. Swivelly mounted at one of its ends on the adaption plate 5 by swivel screw 6, is elevation sight adjustment plate 7, which is adjusted for quick change in elevation shooting by graduated spring button 8 having edge projection 9 for engaging closely spaced V-grooves 10 in the face of graduated elevation adjustment plate 11', between the spring button 8 and the elevation adjustment plate 7. Extending from the graduated spring button 8, through the graduated plate 11' is trunnion 11 having at its end opposite the button 8, cam 12 which extends in the slotted hole 13 designated by dotted lines in Fig. 1. The elevation sight adjustment plate 7 has extending upward from its top, split loop bands 14 and 15 closely fitting the sight barrel 16 with just sufficient looseness to permit slidable movement through said loop bands as the gun recoils or moves backward from the force of discharge of the cartridge within the chamber of the gun, and returned to relative sighting position with the rifle or gun by the helical recoil absorption spring 17 having its forward end resting against the loop band 15 and its rear end resting against the collar 18 integral with the sight barrel. Desired accurate slide fit of the sight barrel in the loop bands 14 and 15 is made by screws 16' by drawing the ends of the loop band until the desired slide fit is obtained. The said recoil absorption spring is enclosed in deformable recoil retarding action bellows 19 that is preferably made of moisture repellent canvas, light leather, or rubber, and has at each of its ends inturned flange portions 20 against which the recoil absorption spring rests and closes the ends of the bellows, thereby preventing rapid escape of air when the bellows 17 is collapsed (as shown in Figure 2) by the recoil of the rifle and the entrance of air when the recoil absorption spring is extended on returning sighting relation of the telescope sight and rifle or gun. During relative sliding movement of the gun and telescope sight by recoil of the gun and the spring 17. The feather key 21 having tapered front end 22 and permanently secured to the sight barrel slides in slots 21' extending transversely of the loop band 14, and open to the bore of the band at diametrical sides of the bore, guides the telescope sight during recoil movement accurately back to the sighting position. The feather key 21 is located in spaced apart relation with the recoil bumper flange 23, a distance slightly greater than the width of the loop band 14, in order that the telescope sight may be turned from one sighting position to its other sighting position by first shoving the sight forward in relation to the gun and then turning the sight by the eyepiece barrel 24 from its alignment with the open or military sights as shown and designated in Figure 2 by the broken line 25 extending axially of the gun barrel and the broken line 26 extending axially of the eyepiece barrel and eyepiece 27, to the offset position designated by broken line 28, in which position either or both eyes may be employed in sighting. Broken line 29 designates the path of light passing through the sight barrel 16 to the eyepiece 27 and curved in its passage by prism 30, which is of the form shown in my United States Patent No. 2,225,637. The prism has cemented to each of its flat ends, lenses 31 and 32 which may or may not have power of refraction, or one or each may be light polarizing lenses. From the lens 31 when employed the light image is projected to eyepiece lenses 33 and from said lenses 33 to the eyepiece lenses 34, and from said lenses 34 to the eye of the shooter. At the front end of the sight barrel 16 is the object lenses 35 that gathers the light image and projects it to the lenses 36, which in turn projects the light image longitudinally of the sight barrel through the ring of the reticle support 37 to the lenses 32. Numeral 37 refers to the sighting reticle support having extending therefrom member 38 through a hole in the sight barrel of the sight to and into annular groove 39 extending eccentric of the turnable collar 40 and with the axis of the sight barrel at the inner periphery of the turnable collar 40 which is the recticle elevation adjusting collar and between which and the collar 18 is friction washer 41. The reticle support 37 is supported in the sight barrel by springable member 37' extending from its collar 38' which is held against a shoulder in the sight barrel by sleeve portion 38" and is adjusted for windage by member 42 extending from the reticle support through a second hole in the sight barrel and into the annular groove 43 extending eccentric with the axis of the sight barrel at the inner periphery of the turnable windage or side sighting adjustment collar 44, between which and the collar 45 secured to the sight barrel is friction washer 46. Adjustably extending into the bell end member 47 of the sight barrel is object lens protector sleeve 48, whereby rain and blown dirt is largely prevented from being deposited on the object lens.

The eyepiece 27 is screw threaded into the eyepiece barrel 24 and is adjusted for individual focusing by screwing the eyepiece in or out of the eyepiece barrel, and is held at the position of any adjustment by spring member 49 having a sharp projection 50 engaging closely spaced apart grooves 51 on the periphery of the eyepiece, and supported in a groove of the prism supporting member 52 at the lenses 31. The prism support 52 is as shown in the accompanying drawings as a semi-circle cross-section, having extending therefrom the eyepiece barrel at one of its ends, and a sleeve 53 at its opposite end extending into the rear end of the sight barrel 16, where it is secured by screw threads or any suitable manner. The prism supporting member 52 is provided with cover 54 for holding the prism in position and preventing displacement of the prism; screws 55 secure the cover 54 to the prism supporting member 52.

Numeral 56 designates the reticle post which, as shown in the drawings, is of the picket type commonly used when game shooting, but may be of the single or cross-hair type as generally employed for fine target shooting or sniping; the picket post is formed integral with the reticle ring 57 is carried by the annular ring portion of the reticle support 37.

Some rifles have a hammer extending upward at the back of the receiver to such extent that it interferes with the eyepiece of the telescope sight when the telescope sight has a short eye relief; in which case I remove the cocking spur of the hammer designated by numeral 58, and provide a shouldered stud such as designated by numeral 59, which I force into a hole drilled transversely through the hammer with a portion of the stud extending from the side of the hammer a sufficient distance to be readily grasped, for cocking the hammer.

Heretofore, telescope sights for guns, with the exception of my telescope sight disclosed by and forming the subject matter of my United States Patent No. 2,225,037, have been of a single barrel structure in which the axis of all the lenses, including the object and eye piece lenses and the sighting reticle, were arranged along the common axis of the sight barrel, and when employed on a gun such as a rifle was necessarily mounted on the rifle above its receiver and action mechanism and therefore precluded the use of the open sights as mounted on on top ejection guns and rifles for the reason the cartridge cases and clips could not be ejected from the top of the receiver; and, further, required the entire telescope sight to be removed from the rifle when it was desired to use the open sights as furnished by the manufacturer; or, required mounting the telescope sight so far above the line of the open sights, that the sighting could be done under the telescope sight barrel. This method of mounting required that a raised comb be added to the butt stock of the rifle in order that the eye of the shooter be raised relatively with the rifle barrel to alignment with the axis of the eye piece of the telescope sight and that required the removal of the raised comb when it was desired to use the open sights. Besides, if the stock fitted the shooter for an open sighting system, it gave either too much or too little drop of stock for other sighting systems. Further, the top mounting could only be used on side ejection rifles unless mounted very high above the receiver, because the barrel of the sight necessarily directly over the top opening of the receiver interfered with or prevented the ejection of the fired cartridge or case and at times caused clogging of the rifle's action. Therefore, side mounting in some cases was resorted to in order that the telescope sight could be employed on top ejecting rifles. This had the objection, in that the comb had to be provided with a thickened cheek pad in order that the eye of the rifleman be supported in alignment with the eye piece of the sight. This prevented the use of open sights, and necessitated a bent stock to bring the butt thereof in proper position against the shooter's shoulder for receiving the recoil. It further increased the apparent recoil of the rifle, but not in alignment with the rifle bore. It resulted in the rifles being swung by the recoil toward the side the rifle barrel is offset, all of which prevents accurate shooting.

In the use of my improved telescope sight, all of the above named objections are eliminated. The position of the shooter's eye, when the butt stock is once fitted to the shooter, is supported directly back of the eyepiece and in alignment with its axis; and when the eyepiece is swung over out of the way as for using the open or military sights, the eye is in the same position and in alignment with and for using the said open military sights as it was for using the telescope sight. Thus, there is no change of stock necessary or dismounting of the telescope sight, other than shoving the telescope sight forward in relation to the gun until the shoulder 23 engages the loop member 14 and turning the sight barrel to a position that will bring the axis of the eye piece in alignment with the alignment of the open sights, or to its offset position farthest removed from said alignment, in which position the telescope sight can be used with the eye farthest from the rifle barrel and the open sights used with the eye nearest the rifle barrel, or both eyes can be used at one and the same time, one with the open sights and the other with the telescope sight, and the cartridge case can be ejected from the top of the rifle's receiver without obstructing or interference with the telescope sight.

Referring particularly to the path of light forming the image of the target to be sighted or shot at, the light rays are gathered by the object lens 35 and projected thereby back through lens 36, past the reticle to the prism 30 in which they are bent and projected by the prism to the lenses of the eyepiece. Thus, it will be seen that the path of light forming the image projected is bent from its path parallel to the axis of the rifle barrel bore to sidewise spaced apart relation thereto, with the axis of the light bundle in alignment with the sighting line of the open sights on the rifle barrel and eyepiece.

In sighting guns and especially rifles, sighting is painstaking, and fine sighting adjustment means must be provided for adjusting the sighting alignment for shooting different distance ranges, and also for the drift of the projectile or bullet caused by cross-winds. In my present telescope sight, adjustment in sighting is made by members 6, 7, 8, 10, 11 and 12 co-acting with the springable reticle support 37 which has extending therefrom, member 42 extending through the wall of the sight barrel and engaging rotatable collar 44 in its annular groove 43 at the inner periphery of the collar 44 and extending eccentric with the axis of the collar and the sight barrel. Lateral adjustment of the reticle is accomplished in like manner by the member 38 extending through the wall of the sight barrel in spaced apart relation to the member 42 and engaging the rotatable collar 40 in its annular groove 39, which like groove 43 of the collar 44, has its axis eccentric with the sight barrel and also with the axis of the groove 43 of the rotatable collar 40. For making adjustment for sight elevation, the button 8 at the side of the gun is turned manually and by the trunnion 11 extending through the elevation sight adjusting plate 7 and by the eccentric cam 12 thereon and turnable in slot 13 of the mounting plate 5, swings the rear end of the elevating sight adjusting plate vertically for elevation in relation with the mounting plate 5 and therefore in relation with the gun barrel. The amount of adjustment or swing of the sight adjustment plate is indicated audibly by the edge 9 of the spring button 8 dropping into the corrugations of the dial plate 11'. The elevation sight adjustment lastly described is independent of the sighting adjustment made by the reticle, and may be made while the gun is in shooting position, while either reticle adjustment requires either one or the other collars 40 or 44 being turned and the amount observed.

Having described my present invention comprising improvements in telescope sights for guns, I claim:

1. In a telescope sight for guns having a hollow barrel and a receiver; the combination of a telescope sight barrel having an object lens at its front end with a shoulder back of the object lens and in spaced apart relation thereto, and a sight adaption plate adapted to be attached to the gun at the receiver, and a sighting elevation adjusting member pivotly connected to the adaption plate the said member having a metal strap like loop encircling the sight barrel in spaced apart relation to the said shoulder and a flexible bellows enclosed helical spring interposed between the said shoulder and loop.

2. In a telescope sight for guns having a hollow barrel and a receiver; the combination of a telescope sight barrel having an object lens at its front end and a prism housing at its rear end with an annular shoulder having a larger diameter than the sight barrel with a metal strap like loop encircling the sight barrel in spaced apart relation to the shoulder and in which the sight barrel is both turnable and slidable, and having a plurality of longitudinally extending slots at its inner periphery, and a feather key integral with the sight barrel in spaced apart relation to the said shoulder and slidably engaging the metal strap like loop in one of the said slots whereby the sight barrel is held against accidental turning, there being a space between the said shoulder and feather key greater than the width of the loop for permitting the sight barrel to be turned in the loop for changing the feather key from one of the slots of the loop to another slot of the loop.

3. In a telescope sight for guns having a hollow barrel and a receiver; the combination of a telescope sight barrel in transverse spaced apart relation to the hollow barrel and having an object lens at its front end and a prism housing at its rear end with an annular shoulder having a larger diameter than the sight barrel with a metal strap like loop encircling the sight barrel in spaced apart relation to the shoulder and in which the sight barrel is turnable, and having a plurality of longitudinally extending slots at its inner periphery, and a key integral with the sight barrel and engaging the metal strap like loop in one of the said slots whereby the sight barrel is held against accidental turning.

4. The combination, in a telescope sight having a sight barrel with an offset eyepiece at its rear end and a tubular object lens mounting portion at its front end and a shoulder adjacent thereto, of an adapter plate adapted to be rigidly attached to one side of the gun and having a cam engaging slot therein, and an elevation sighting adjustment plate pivotally connected to the said adaptor plate with a pair of loops extending therefrom for slidably supporting the sight barrel with one of the said loops adjacent the said shoulder adjacent the object lens mounting portion, with a flexible, bellows enclosed, helical, recoil absorbing spring between the loop and a collar on the sight barrel between the said loops, and a turnable button member at the exposed side of the elevation sighting adjusting plate, and having a cam connected therewith and extending into the cam slot of the adaption plate for changing the elevation sighting when the said button member is turned.

5. The combination, in a telescope sight having a sight barrel with an offset eyepiece at its rear end and a tubular object lens mounting portion at its front end and a shoulder adjacent thereto, of an adaptor plate adapted to be rigidly attached to one side of the gun, and an elevation sighting adjustment plate pivotally connected to the said adaptor plate with a pair of loops extending therefrom for slidably supporting the sight barrel, with a flexible, bellows enclosed, helical, recoil absorbing spring between the interposed loops and the shoulder adjacent the object lens mounting portion, and a turnable button member at the exposed side of the elevation sight adjusting plate, and having a cam connected therewith for changing the elevation sighting when the said button member is turned.

6. The combination, in a telescope sight having a sight barrel with an offset eyepiece at its rear end and a tubular object lens mounting portion at its front end, of an adaptor plate to be rigidly attached to one side of the gun, and an elevation sighting adjustment plate pivotally connected to the said adaptor plate with a pair of loops extending therefrom for slidably supporting the sight barrel, with one of said loops adjacent object lens mounting portion, with a flexible, bellows enclosed, helical recoil absorbing spring interposed between the said loop and a collar on the sight barrel.

7. In a telescope sight having a sight barrel with a reticle springable support supported therein intermediate its ends and having a pair of projecting members extending therefrom through the wall of the sight barrel and therefrom in spaced apart relation to each other, with a ring encircling the sight barrel and having an annular groove at its inner periphery in eccentric relation to the axis of the sight barrel, and having its periphery engaging one of the said projecting members for moving the reticle support and reticle transversely of the sight barrel in one direction, and a second ring encircling the sight barrel and having an annular groove at its inner periphery in eccentric relation to the axis of the sight barrel, with its periphery engaging the other projecting member for moving the reticle support and reticle transversely of the sight barrel in a direction at substantially right angle to the first named movement.

8. In a telescope sight having a sight barrel with a reticle support mounted therein and moveable transversely of the sight barrel with a plurality of projecting members extending from the reticle support through the wall of the sight barrel and therefrom in spaced apart relation to each other substantially one-fourth the circumference of the sight barrel and longitudinally thereof, a pair of reticle adjusting rings encircling the sight barrel, each ring having a groove at its inner periphery extending eccentric with its axis at its inner periphery and engaging one of the projecting members exterior of the sight barrel and having frictional engagement with a frictional member at opposite sides of the reticle adjusting rings.

9. In a telescope sight having a sight barrel with a reticle support mounted therein and moveable transversely of the sight barrel with a projecting member extending from the reticle support through the wall of the sight barrel and therefrom, a reticle adjusting ring encircling the sight barrel, the said ring having a groove at its inner periphery extending eccentric with its axis at its inner periphery and engaging the projecting member exterior of the sight barrel and having frictional engagement with a frictional member.

10. The combination, in a telescope sight, of an adapter plate adapted to attach the sight to a gun and having a sight adjustment plate pivotally connected thereto and a slot in spaced apart relation to the pivotal connection, a turnable button like element at the exposed side of the adjustment plate and having a trunnion extending through the adjustment plate with a cam thereon engaging the adapter plate within the slot thereof and sight barrel engaging members extending from the adjustment plate for slidably and turnably supporting the sight barrel.

CHARLES W. DAKE.